United States Patent [19]

Oliphant et al.

[11] Patent Number: 4,847,676
[45] Date of Patent: Jul. 11, 1989

[54] COLOR TELEVISION SYSTEM

[75] Inventors: Andrew Oliphant, Redhill; Charles P. Sandbank, Reigate, both of United Kingdom

[73] Assignee: British Broadcasting Corporation, London, England

[21] Appl. No.: 486,952
[22] PCT Filed: Jul. 12, 1982
[86] PCT No.: PCT/GB82/00205
§ 371 Date: Mar. 10, 1983
§ 102(e) Date: Mar. 10, 1983
[87] PCT Pub. No.: WO83/00269
PCT Pub. Date: Jan. 20, 1983

[30] Foreign Application Priority Data

Jul. 12, 1981 [GB] United Kingdom ............... 8121490

[51] Int. Cl.4 ........................................... H04N 11/00
[52] U.S. Cl. ..................................... 358/12; 358/141; 358/180
[58] Field of Search ............... 358/12, 17, 19, 16, 358/180, 145, 133, 141, 242

[56] References Cited

U.S. PATENT DOCUMENTS

| 2,820,091 | 1/1958 | Parker et al. | 358/19 |
| 3,097,262 | 7/1963 | Ehenhaft | 358/180 |
| 3,507,981 | 4/1970 | Eilenberger | 358/12 |
| 3,781,463 | 12/1973 | VandenBussche | 358/12 |
| 4,335,393 | 6/1982 | Pearson | 358/12 |
| 4,400,717 | 8/1983 | Southworth et al. | 358/12 |

FOREIGN PATENT DOCUMENTS

| 51-819 | 4/1977 | Japan | 358/12 |
| 789673 | 1/1958 | United Kingdom | 358/16 |
| 852512 | 10/1960 | United Kingdom | 358/16 |

OTHER PUBLICATIONS

C. W. Rhodes, Time Division Multiplex of Time Compressed Chrominance for a Compatible High Definition Television System, IEEE Transactions on Consumer Electronics, vol. CE28, No. 4, Nov. 1982, pp. 592–602.
Zworykin et al., Television The Electronics of Image Transmission in Color and Monochrome, p. 544, 1954, John Wiley & Sons Inc.
Television Standards and Practice, Edited by D. G. Fink, McGraw-Hill Book Co., Inc., 1943, p. 36.
NHK Laboratories Note, No. 192, Dec. 1975, "The Present State of High Definition Television", pp. 1 & 3–8.

Primary Examiner—John W. Shepperd
Attorney, Agent, or Firm—Robert F. O'Connell

[57] ABSTRACT

In a color television signal the total line length or period and the bandwidth requirement can be conventional, but the active line period is increased to e.g. about 94% of the line period, giving an aspect ratio of about 3:2 instead of 4:3.

7 Claims, 2 Drawing Sheets

COLOR TELEVISION SYSTEM

BACKGROUND OF THE INVENTION

This invention relates to color television systems.

All existing broadcast television standards have a picture aspect ratio (the ratio of picture width to picture height) of 4:3. This ratio was chosen for compatibility with ordinary motion picture standards.

A greater sense of realism could be conveyed by television pictures if the aspect ratio were increased so that the picture filled more of the viewer's field of view. Wide-screen presentations are now commonplace in cinemas. A number of proposals have been made for television standards with a higher aspect ratio, but these all involve a higher video bandwidth.

This invention enables the provision of a higher aspect ratio within the same bandwidth as existing television standards.

In the U.K. System I 625-line standard, the total length of the line is 64 μs. However, only 52 μs is used for the picture. This is known as the active line period. The remaining 12 μs, known as the horizontal blanking interval, is required to transmit a synchronising pulse for the horizontal synchronising of the receiver, a black level pulse which provides a d.c. clamping reference, and a burst of color subcarrier to synchronise the receiver's PAL decoding circuits. The receiver uses the time of the horizontal blanking interval for horizontal flyback of the scanning spot in the cathode ray tube to the start of the next line.

SUMMARY OF THE INVENTION

The present invention is defined in the appended claims to which reference should now be made.

In a system embodying this invention we propose that the total line length of 64 μs is retained, but the active line length is increased. The remaining time would be used to provide horizontal synchronising information and a period of black level as a d.c. clamping reference.

In this way it is possible to achieve an aspect ratio of greater than 4:3. The active line may constitute at least 85% or even 90% of the line period, and the color synchronising information may be transmitted either during the black level pulse or during the vertical blanking interval, so that there is no separate period of color synchronising information during the line period. As a further alternative, color synchronising information could be obtained from the digital sound signal or its carrier or multiplex system.

BRIEF DESCRIPTION OF THE DRAWINGS

The invention will be described in more detail, by way of example, with reference to the drawings, in which.

DETAILED DESCRIPTION OF THE PREFERRED EMBODIMENTS

Figure 1:
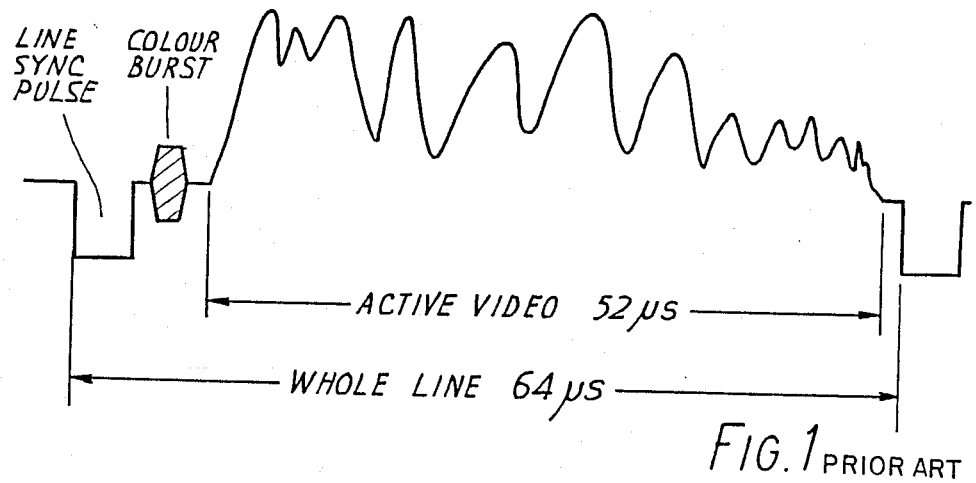
FIG. 1 illustrates in diagrammatic form one television line according to existing television standards.

The conventional television line shown in FIG. 1 has a line period of 64 μs, of which 52 μs constitutes the active video signal, this being about 81% of the line period. The remaining 12 μs is used as flyback time and for synchronising information. More particularly, the line commences with a line sync. pulse and is then followed by a period of black level transmitted as a d.c. reference and on part of which is superposed the color synchronising burst. All this is well known.

Figure 2:
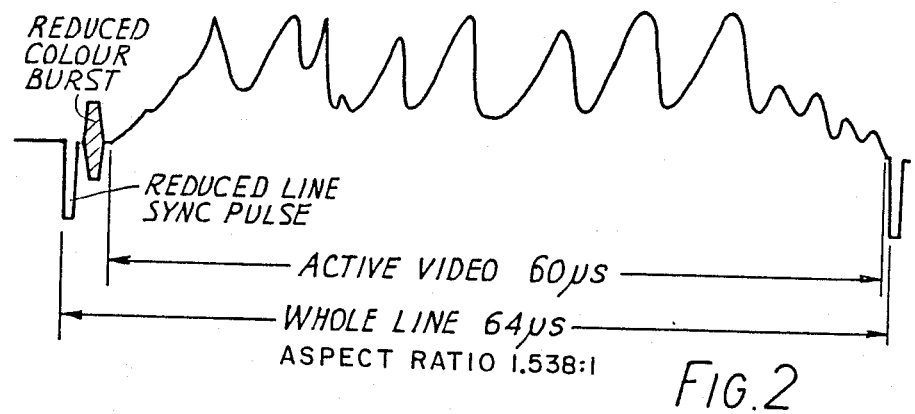
FIG. 2 is a similar drawing of a first television line embodying this invention, using a narrow synchronising (sync.) pulse and a reduced color burst superposed on the black level portion of the signal.
Figure 3:
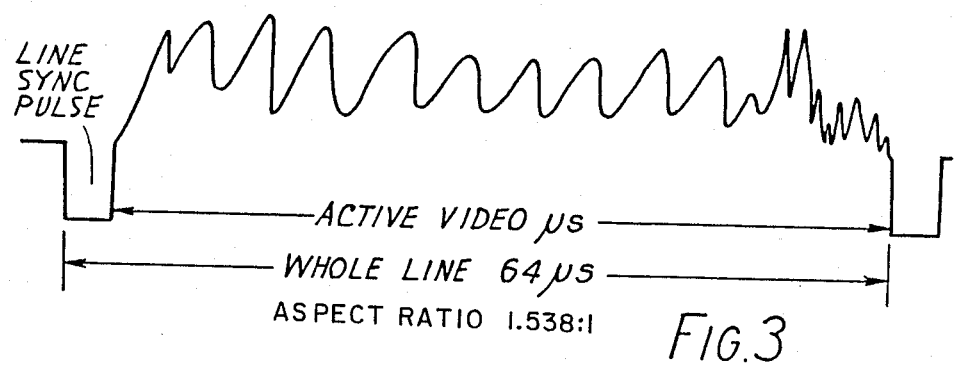
FIG. 3 is a similar drawing of a second television line embodying this invention using a wider sync. pulse but with the color synchronising information transmitted separately.

In accordance with the embodiments shown in FIGS. 2 and 3, the active video signal occupies 60 μs or nearly 94% of the line period. This gives an aspect ratio increased from 4:3 or 1.333 to 1.538. Coloring information may be transmitted in the active video using the PAL system substantially as at present. "NEW PAL" techniques may be used for decoding the signal with a different form of color synchronising burst.

To carry color synchronising information, the embodiment of FIG. 2 uses a short burst which is transmitted superimposed on a reduced period of black level. The line sync. pulse is also shorter.

Figure 6:
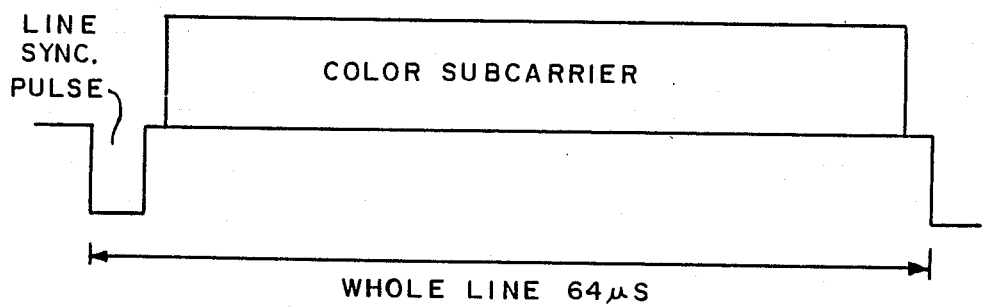
FIG. 6 shows, schematically, transmission of a color burst in a line in the vertical blanking interval.

FIG. 3 shows an embodiment in which the color synchronising information is not transmitted during the relevant line period at all. It may then be transmitted in various other ways. For example, a much longer burst of color subcarrier (which could extend over several lines) may be transmitted on unused lines during the vertical blanking interval of the signal, as shown in FIG. 6, for example. Alternatively, the sound carrier signal in the composite PAL signal could have a frequency which was simply related to the color subcarrier frequency, e.g. one and a half times the subcarrier frequency, which for PAL system I is approximately 6.645 MHz. (Such sound carrier locking has been proposed for two-channel sound systems for television, particularly for satellite broadcasting). Other possibilities would be to obtain color synchronising information from the timing of digitally transmitted sound signals or from 'housekeeping' signals in a data multiplex system.

Figure 4:
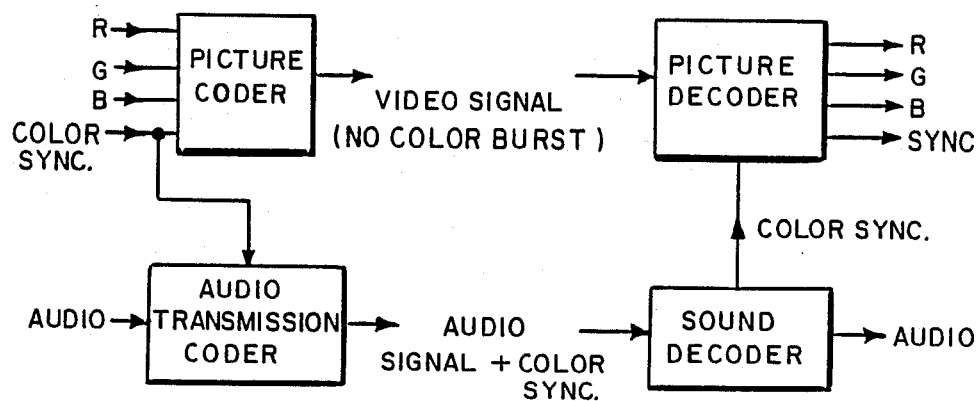
FIG. 4 is a schematic diagram showing how color synchronizing information may be transmitted with the sound signal.

A schematic diagram showing the color synchronized signal being transmitted with the sound signal, for example, is depicted in FIG. 4.

The system of FIG. 3 would maintain line synchronisation better in the presence of noise than the FIG. 2 embodiment.

A modified form of the PAL system may be used where chrominance, low frequency luminance and high frequency luminance are transmitted in three separate frequency bands by frequency-shifting the high frequency luminance to above the chrominance frequency band.

The system could be particularly beneficial when storage and interpolation are used in the receiver to increase the display line and field rate, reducing visibility of the television line structure and eliminating flicker, as described in our British Patent Application 2,050,109. The higher aspect ratio given by a system embodying this invention, in addition to the above improvements, would give a display of higher quality than is achieved with present receivers and the present broadcast system, but without increasing the bandwidth required for transmission. Thus although the increased aspect ratio requires some departure from compatibility, existing transmission channels could be used and the modifications at the receiver represent a relatively minor change, comparable with those required for limited access services.

The system would have particular utility with receivers using matrix addressed displays such as may become available in the future. Such receivers would not require flyback time as at present. Techniques for extracting timing information are now such that the well-defined horizontal synchronising pulse and colour synchronising burst currently employed are no longer required to the same degree of definition. Several proposals for limited-access television services using different forms of synchronisation have been made, and a practical implementation of the invention can be based upon such a system with appropriate alteration to the system timing.

Thus the circuitry required for implementation of the present invention is identical to that required for conventional television signal processing, the only alterations necessary for the FIG. 2 embodiment being to retime the duration of the various components of the signal. In the FIG. 3 embodiment the retiming would extend to transmitting the color synchronising information outside the line period or as noted above, in a separate part of the composite signal.

The proposed system would not be compatible with existing receivers because of the shortening or removal of the normal line synchronising pulses.

Figure 5:
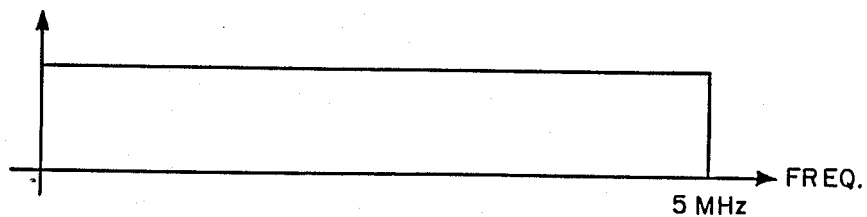
FIG. 5 shows a 5 MHz bandwidth signal.

It should be noted that in the present U.K. PAL System I the active line period of 64 μs is divided as to 81¼% active line period and 18¾% blanking period having an exemplary 5 MHz bandwidth as shown in FIG. 5. It is proposed in accordance with this invention to provide an active line period which is greater than 85% and preferably greater than 90% and 95% up to a maximum in the region of 97½%. This leaves up to only about 1.6 μs for the horizontal blanking interval. The aspect ratio could be increased from the present 4:3 or 1.333:1 to up to 4.8:3 or 1.6:1, though the value of 3:2 or 1.5:1 represents a useful increase.

The video bandwidth requirements are in this way not increased over those currently pertaining.

We claim:

1. In a standard color television system using a color video information signal having a standard line duration and comprising an active video information portion and a non-active video information portion, said system further having defined bandwidth requirements and a defined relationship between the picture aspect ratio thereof and the active video information portion for a given picture height, the improvement comprising a color television video signal for use in said system wherein the active video information portion occupies at least 85% of said standard line duration, whereby the picture aspect ratio is increased to a ratio greater than a 4:3 ratio without increasing said defined bandwidth requirements and without substantially changing said defined relationship.

2. A color television signal according to claim 1 and further wherein color synchronizing information is transmitted in another signal which is separate from said color television video signal.

3. A color television signal according to claim 2, in which said other signal is an audio signal for use in said system.

4. A color television system according to claim 5, in which color synchronising information is transmitted during the vertical blanking interval.

5. A color television signal according to claim 1, in which a d.c. clamping reference is transmitted during the non-active-video information portion thereof.

6. A color television signal according to claim 1 wherein said active video portion is greater than 90% of the total line duration.

7. A color television signal according to claim 1 wherein said standard line duration is about 64 microseconds and said defined bandwidth is about 5 MHz.

* * * * *